Aug. 16, 1938.   W. O. MATTERN   2,127,181
TOOL FOR HANDLING LENSES
Filed May 26, 1937
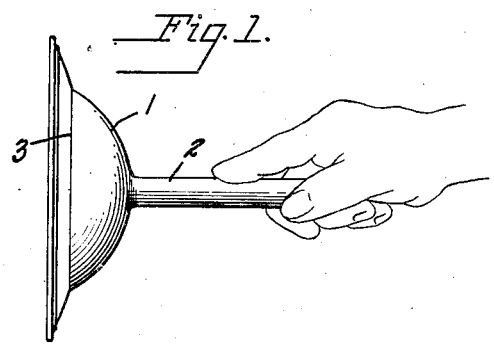
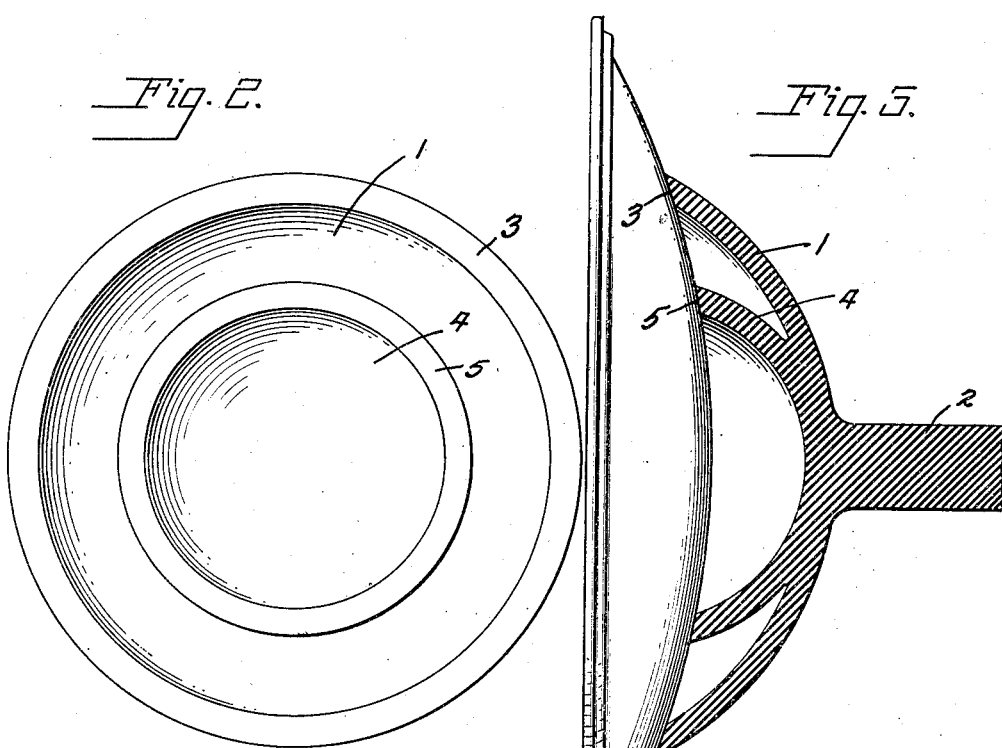
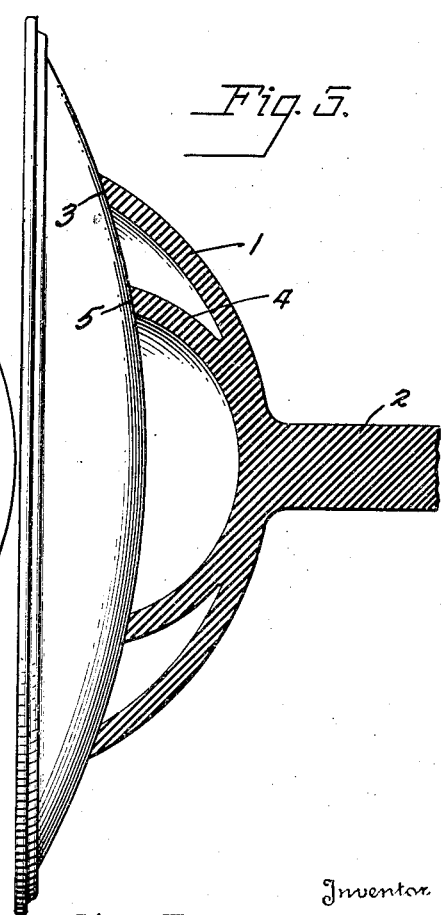
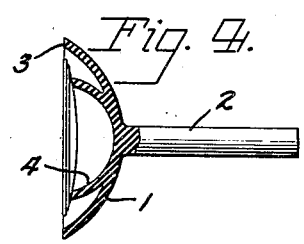
Inventor
W. O. Mattern
By Mason Fenwick & Lawrence
Attorneys Patented Aug. 16, 1938

2,127,181

UNITED STATES PATENT OFFICE 2,127,181

TOOL FOR HANDLING LENSES

William O. Mattern, Shamokin, Pa.

Application May 26, 1937, Serial No. 144,946

1 Claim. (Cl. 294—64)

This invention relates to tools, and more particularly to a tool for use in lifting and positioning lenses of substantial size, such as are used in automobile headlights.

The object of the invention is to provide an improved tool of the type indicated of simple construction, which is easily applied to and removed from the lens as desired, and capable of being used with a substantial range of sizes of lenses.

The invention consists in the novel construction and arrangement of parts, as hereinafter more particularly pointed out.

One sheet of drawings accompanies this specification as part thereof, in which like letters indicate like parts throughout.

In the drawing:

Fig. 1 is a perspective view showing the tool in position on a lens ready to be applied.

Fig. 2 is an end view of the tool.

Fig. 3 is a transverse section through the tool, showing the same applied to a lens.

Fig. 4 is a view similar to Fig. 3, showing the tool applied to a substantially smaller lens.

Referring to the drawing further, 1 indicates a cup-like part having an outwardly extending integrally formed handle 2, and having an annular planar lip 3.

An additional cup 4 is nested within the cup 1 and formed integrally therewith, also formed with an annular planar lip 5 of lesser diameter than the lip 3. By this construction it will be observed that lip 5 is spaced from lip 3 both radially and axially.

The entire device is formed integrally, as indicated, of a flexible material such as rubber, and operates through suction by being pressed against the lens which is to be handled and creating a vacuum within the cups.

By reason of the specific construction of this device, it will be apparent that with a larger convex lens both cups will engage the lens while with a smaller lens the inner cup only will engage the lens but the device will function with great efficiency.

Various modifications will readily suggest themselves to those skilled within the art but within the scope of the present invention as claimed.

Having thus fully described my invention, I claim:

A tool for handling lenses and the like, comprising a plurality of nested cup-like parts having a common axis and each having an annular planar lip, said lips being spaced apart radially and axially, and a handle extending axially outward, said handle and cups formed integrally of a flexible material such as rubber.

WILLIAM O. MATTERN.